B. SCHWERIN.
PROCESS FOR THE MANUFACTURE OF HYDROXID OF ALUMINIUM.
APPLICATION FILED MAY 13, 1915.
1,216,371.
Patented Feb. 20, 1917.
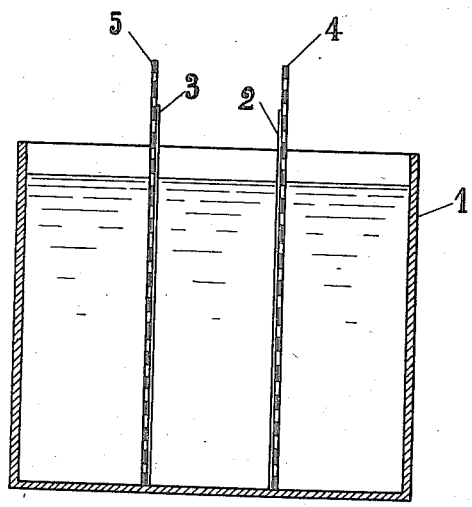
Inventor
Botho Schwerin
by Foster Freeman Watson & Cort
Attys.

UNITED STATES PATENT OFFICE.

BOTHO SCHWERIN, OF FRANKFORT-ON-THE-MAIN, GERMANY, ASSIGNOR TO ELEKTRO-OSMOSE AKTIENGESELLSCHAFT (GRAF SCHWERIN GESELLSCHAFT), OF FRANKFORT-ON-THE-MAIN, GERMANY, A CORPORATION.

PROCESS FOR THE MANUFACTURE OF HYDROXID OF ALUMINIUM.

1,216,371. Specification of Letters Patent. Patented Feb. 20, 1917.

Application filed May 13, 1915. Serial No. 27,917.

*To all whom it may concern:*

Be it known that I, BOTHO SCHWERIN, residing at Wilhelmstrasse 34, Frankfort-on-the-Main, Germany, have invented certain new and useful Improvements in Processes for the Manufacture of Hydroxid of Aluminium, of which the following is a specification.

The well known processes for the production of aluminium hydroxid have the disadvantage of precipitating the same in very dilute form. Moreover, in such processes the residue of caustic soda is almost completely converted into carbonate by agitation and must in turn be calcined. The energy consumed by agitation, condensation and calcination increases the cost of the process. Moreover, there is obtained an aluminium-oxy-hydrate, which cannot be readily filtered, and which contains a large quantity of caustic soda and silicic acid, which are deleterious for the manufacture of aluminium.

The present invention relates to a process for the manufacture of hydroxid of aluminium. The process makes use of the sodium aluminate liquor produced in the usual way from bauxite. This liquor is treated with sulfuric acid or another suitable acid, whereby the aluminium hydroxid is precipitated in slime-like form. This material is now subjected to the action of the electric current. The apparatus used to this end may as shown in the accompanying drawing comprise a receptacle 1 which includes three chambers. The middle chamber is confined by two suitable diaphragms 2, 3, (for instance, of viscose).

Closely fitted to these diaphragms are provided the electrodes 4, 5, in the side-chambers. The aluminium hydroxid mixture is now subjected to the action of an electric current in the middle chamber. During this process the sodium hydroxid (NaOH) wanders into the cathodic compartment, the sulfuric acid into the anodic chamber. The NaOH may be regained and used for the preparation (solution) of the bauxite or owing to its great pureness, employed alone.

Between the two diaphragms remains the aluminium hydroxid in granular form, while the weak sulfuric acid solution contains the impurities. This mass may be readily filtered in suitable way, the use of filter presses being unnecessary.

Example: A 6% sodium aluminate liquor is treated with the equivalent amount of sulfuric acid until it is neutralized as shown by test with phenol-phthalein. The pulpy mass containing the aluminium hydroxid is subjected, between 2 viscose-diaphragms, to an electric current of 10–15 volts at 8–10 amperes per square dcm. of electrode surface. The process is completed after about three hours; the caustic soda in the cathode chamber is enriched about 5%; the sulfuric acid returns to the process. The aluminium hydroxid obtained is entirely pure.

It has previously been proposed to manufacture aluminium hydroxid by first producing an alkali metal aluminate electrically and then converting the latter, in the usual manner, into aluminium hydroxid. For example, it has been proposed to subject aluminium sulfate in the anode chamber, and alkali metal chlorid in the cathode chamber, to the action of an electric current. The aluminium passes over to the cathode-chamber, where aluminate of alkali is formed.

The acid employed to precipitate the hydroxid of aluminium from the aluminate liquor may be derived from acid-forming gases, for instance, chlorin gas, which may be passed into the solution. The chlorin causes precipitation of aluminium in the form of hydroxid of aluminium.

By treating the mixture in a centrifuge before subjecting the mixture to the electric current, the principal part of the precipitated material may be separated from the liquid. The dry material is then treated in the above described way. By this modified process the amount of electric energy is reduced.

What I claim is:

1. A process for the manufacture of hydroxid of aluminium from aluminate of alkali consisting in precipitating the aluminium hydroxid with acid and subjecting the resulting aluminium hydroxid, and associated impurities, to the action of an electric current between diaphragms which permit the passage of soluble inorganic electrolytes.

2. A process for the manufacture of hydroxid of aluminium from aluminate of alkali consisting in precipitating the aluminium hydroxid with acid and subjecting the resulting aluminium hydroxid, and associated impurities, to the action of an electric current between diaphragms consisting of viscose.

3. A process for the manufacture of aluminium hydroxid from aluminate of alkali consisting in precipitating the aluminium hydroxid with acid, treating the mass containing the precipitate in a centrifuge, and subjecting the centrifugated material between diaphragms to the action of an electric current.

4. A process for the manufacture of hydroxid of aluminium from aluminate of alkali consisting in passing acid-forming gases into said aluminate to precipitate the aluminium hydroxid and subjecting the resulting aluminium hydroxid, and associated impurities, to the action of an electric current between diaphragms.

5. A process for the manufacture of hydroxid of aluminium from aluminate of alkali consisting in precipitating the aluminium hydroxid with acid formed by acid forming gases, treating the mass containing the precipitate in a centrifuge, and subjecting the centrifugated material between diaphragms to the action of an electric current.

In testimony whereof I affix my signature in presence of two witnesses.

BOTHO SCHWERIN.

Witnesses:
JEAN GRUND,
CARL GRUND.